United States Patent [19]

Schnittgrund

[11] Patent Number: 5,385,710
[45] Date of Patent: Jan. 31, 1995

[54] DIFFUSION RESISTANT REFRACTORY FOR CONTAINMENT OF FLUORINE-RICH MOLTEN SALT

[75] Inventor: Gary D. Schnittgrund, Granada Hills, Calif.

[73] Assignee: Rockwell International Corporation, Seal Beach, Calif.

[21] Appl. No.: 170,954

[22] Filed: Dec. 21, 1993

[51] Int. Cl.⁶ .......................... B09B 3/00; B01J 19/02
[52] U.S. Cl. ...................... 422/184; 48/92; 422/240
[58] Field of Search ............... 422/184, 239, 240, 241; 48/74, 92; 501/123, 118, 125

[56] References Cited

U.S. PATENT DOCUMENTS

| | | | |
|---|---|---|---|
| 2,276,188 | 3/1942 | Greger | 429/26 |
| 4,522,926 | 6/1985 | Felice | 501/127 |
| 4,568,652 | 2/1986 | Petty, Jr. | 501/127 |
| 4,998,710 | 3/1991 | Pelton | 266/286 |

FOREIGN PATENT DOCUMENTS

| | | |
|---|---|---|
| 0840132 | 7/1976 | Belgium . |
| 1322009 | 10/1988 | Canada . |
| 2712746 | 9/1977 | Germany . |
| 1569474 | 6/1980 | United Kingdom . |

OTHER PUBLICATIONS

Hiragushi et al. "Corrosion resistance of refractories to calcium–fluoride–containing slag" *Taikabutsu*, vol. 237, pp. 514–516, 1977.

Stepanov et al. "Impregnation of porous materials with molten salts" *Rasplavy*, vol. 2, pp. 63–67, 1991.

*Primary Examiner*—Robert J. Warden
*Assistant Examiner*—Robert Carpenter
*Attorney, Agent, or Firm*—H. Fredrick Hamann; Harry B. Field; Steven E. Kahm

[57] ABSTRACT

Diffusion resistant refractory such as alumina for containment of destructive fluorine and fluorine compounds in the molten salt oxidation of fluorine-containing organic waste, formed of a porous refractory such as porous alumina impregnated with a salt such as sodium carbonate, which is non-reactive with the refractory and compatible with the molten salt reaction medium, thereby effectively blocking diffusion baths for fluorine and its compounds from the molten salt bath through the refractory. Conventional refractories such as alumina bricks containing about 1 to about 25% open porosity can be placed in a molten liquid salt such as molten sodium carbonate, in a vessel which can be pressurized to force the molten sodium carbonate into the pores of the alumina brick to impregnate same and form alumina brick resistant to diffusion of fluoride-rich molten salt.

14 Claims, 1 Drawing Sheet 5,385,710

DIFFUSION RESISTANT REFRACTORY FOR CONTAINMENT OF FLUORINE-RICH MOLTEN SALT

BACKGROUND OF THE INVENTION

1. Field of the Invention

This invention relates to the destruction of organic waste in a molten salt medium, and is particularly directed to an improved molten salt vessel formed of diffusion resistant refractory for containment of molten salt used in a reaction for oxidative destruction of fluorine-containing organic waste and for preventing diffusion of destructive fluorine and fluorine compounds from said organic waste into the refractory brick forming the wall of the reaction vessel, and preventing destruction of the brick.

2. Description of the Prior Art

Molten salt oxidation (MSO) has been demonstrated to be a suitable technology for destroying hazardous organic wastes. The technology achieves this destruction by the catalytic oxidation of the organic compounds by molten salts at elevated temperatures. Certain of such organic wastes comprise fluorine-containing compounds such as Freons, which are chloro-fluoro methanes, and halons, which are similar to Freons, but contain a mixture of bromine and fluorine atoms, and which may also contain chlorine atoms, instead of just chlorine and fluorine atoms.

Conventional refractory bricks such as alumina bricks employed to form the wall of molten salt reaction vessels for containing molten salt, e.g. at 1000° C., contain extensive open porosity, e.g. in the 2 to 20% range which accelerates diffusion of destructive fluorine and fluorine compounds such as the Freons and halons, into the brick. This leads to rapid destructive phase changes in the refractory or brick, such as alumina.

Thus, for example, molten salt oxidation normally employs sodium carbonate for the molten salt. When applied to hazardous fluorine-containing wastes, a reaction product will be sodium fluoride. Sodium fluoride is particularly reactive with and destructive of the alumina refractory or brick.

SUMMARY OF THE INVENTION

It has been found that the above problem can be solved by pre-impregnating the refractory or brick forming the wall of the molten salt reaction vessel with a salt or salt mixture which is non-reactive with the composition of the refractory and which is compatible with the molten salt reaction medium.

Thus, for example, where alumina is employed as the refractory for the molten salt reaction vessel, alkali carbonate, e.g. sodium carbonate, or mixtures thereof with alkali halide, such as sodium chloride, can be impregnated into the brick microstructure, such salts being non-reactive with the alumina brick, thereby effectively blocking the diffusion paths for fluorine compounds such as sodium fluoride formed by reaction of the molten salt with the fluorine-containing organic wastes. Certain of these salt materials, which may also contain CaO, impregnated into the refractory bricks potentially can also combine with fluorine compound to form "sacrificial" stable and relatively harmless fluoride compounds such as calcium fluoride, thereby preventing the brick from being attacked and destructively altered.

The salt impregnated into the pores of the brick should be compatible with the molten salt bath, that is substantially inert therewith. Such impregnated salt can have the same composition as the molten salt bath, e.g. $Na_2CO_3$, or a different composition.

OBJECTS OF THE INVENTION

It is accordingly an object of the present invention to provide an improved molten salt oxidation vessel resistant to destruction by fluorine-containing compounds present in organic waste subjected to treatment in the molten salt.

Another object is the provision of refractory or refractory bricks for molten salt reaction vessels which are resistant to diffusion by destructive fluorine compounds contained in fluoride-rich molten salts.

A still further object is to provide diffusion resistant refractory for molten salt reaction vessels for oxidizing fluorine-containing organic waste, in the form of a refractory, particularly alumina, which is porous and the pores of which are filled with a salt or salt mixture which is nonreactive with the alumina to prevent diffusion of fluoride compounds from the molten salt into the refractory, and which is inert or non-reactive with the molten salt reaction medium.

Other objects and advantages of the invention will be apparent or made obvious by the description below of certain preferred embodiments of the invention.

DETAILED DESCRIPTION OF THE INVENTION AND PREFERRED EMBODIMENTS

Figure 1:
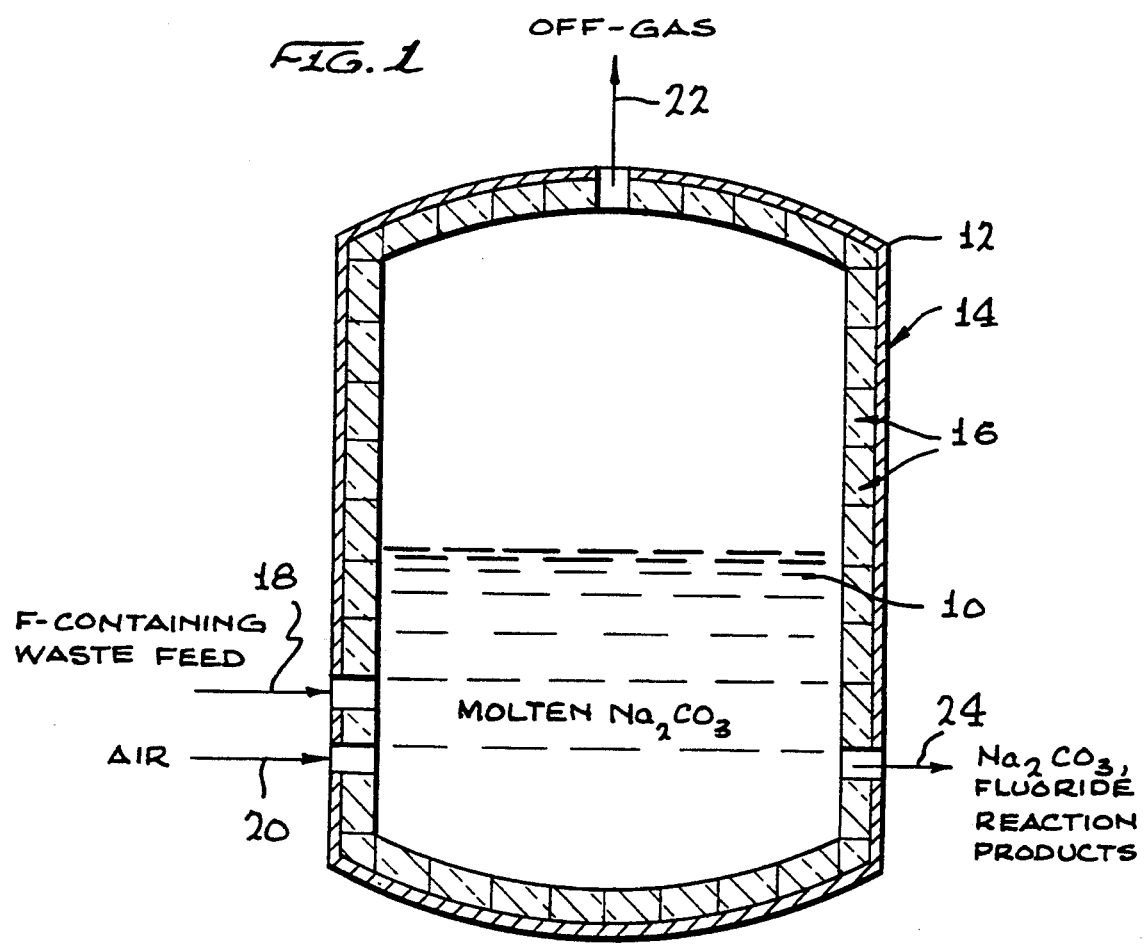
FIG. 1 of the drawing represents a simplified diagram of a molten salt oxidation system or furnace which can be employed for molten salt oxidation of fluorine-containing organic waste and having a wall formed of diffusion resistant refractory bricks according to the invention.

Referring to the drawing, there is illustrated in FIG. 1, a molten salt oxidation system according to the invention, showing a molten salt bath, e.g. a molten sodium carbonate bath, at 10 in a furnace 12 having a wall 14 formed of refractory bricks 16, e.g. of alumina, the pores of which have been pre-impregnated with a non-reactive salt or salt mixture, according to the invention, as described in greater detail hereinafter.

The feed of the fluorine-containing organic waste is introduced at 18, together with air at 20 into the molten sodium carbonate bath. The off-gas including $CO_2$ gas formed by the oxidation reaction, and $N_2$ is discharged at 22. The molten sodium carbonate salt and fluoride reaction products are discharged at 24.

The molten bath 16 contained in the bottom of the treatment vessel and into which the organic fluorine-containing waste is introduced can be of any known composition serving as a medium for treatment, i.e. oxidation, of such organic waste. Thus, such molten salt bath can contain an alkali metal carbonate such as sodium carbonate or potassium carbonate, or mixtures thereof, e.g. a mixture of 50% $Na_2CO_3$ and 50% $K_2CO_3$, by weight, mixtures of alkali carbonate such as sodium carbonate and sodium chloride, and mixtures of calcium oxide and calcium chloride can be utilized.

The organic waste feed treated in the molten salt bath 16 contains fluorine-containing compounds. These can include completely substituted organics with F substituted for H, or organics which are predominantly chlorinated or brominated, with just 1 or 2 F atoms, e.g. as fluorocarbons, chlorofluorocarbons such as Freons, and bromofluorocarbons such as the halons. For example the Freons can include trichloro-monofluoro methane, dichloro-difluoro methane and chloro-trifluoro methane. Examples of halons are difluoro-monochloro-monobromomethane and bromo-trifluoromethane.

The temperature of the molten salt bath for carrying out the oxidation of the organic waste generally ranges from about 700° to about 1000° C., e.g. about 900° C. and such temperature can be maintained by incorporating the molten salt process vessel 10, e.g. within an electric furnace (not shown). An auxiliary fuel such as diesel oil may be added to the molten salt bath with the organic waste feed at 18. All or a portion of the heat is generated by the oxidation reaction itself.

The fluorine compounds present in the organic waste feed at 18, e.g. in the form of a Freon or halon introduced into the molten salt bath 10, reacts with the alkali or alkaline earth metal of the molten salt, e.g. sodium or calcium, to form sodium fluoride or calcium fluoride. While the molten salt such as sodium carbonate or mixtures thereof with sodium chloride do not react with conventional refractory brick such as alumina or silica brick, the reaction product of the sodium carbonate molten salt with the fluorine-containing organic waste, particularly sodium fluoride, is highly reactive with alumina, and also to a lesser extent is calcium fluoride, the reaction product of a molten salt such as calcium chloride containing calcium oxide, with the fluorine-containing organic waste.

Pure alpha alumina, silica alumina or magnesia alumina brick or block normally employed as refractory for molten salt oxidation processes of the type described above, have an open porosity generally ranging from about 1 to about 25%. Commercially available brick made by cold pressing and sintering can have an open porosity of about 8 to about 22%. Fused cast block made by melting pure alumina or magnesia alumina and pouring it into a mold, can have an open porosity of about 1 to about 6%. Silica brick having an open porosity in the above general range also can be employed.

According to the invention concept, in order to prevent diffusion of destructive fluorine and fluorine-containing compounds such as sodium fluoride into the porous, e.g. alumina, brick resulting in rapid destructive phase changes therein, the brick is pre-impregnated with non-reactive salts or salt mixtures, which are non-reactive with the brick and which are compatible with the molten salt reaction medium, and which may also be sacrificial, that is react with the destructive fluorides in the organic waste to produce essentially non-reactive fluorides such as calcium fluoride. Such salts which are non-reactive with the alumina brick and which can be impregnated into the open porosity thereof include alkali carbonate, such as sodium carbonate, alkali carbonate-alkali chloride mixtures such as sodium carbonate and sodium chloride, and alkaline earth oxide and alkaline earth halide, e.g. calcium oxide-calcium chloride, mixtures.

Where calcium oxide, calcium chloride mixtures are employed, the fluorine-containing compounds in the organic waste can react with the calcium oxide to produce sacrificial calcium fluoride which is less reactive with the brick, e.g. alumina brick, than sodium fluoride. However, even such sacrificial reaction would occur only at the surface of the brick and would markedly reduce the diffusion of any calcium fluoride into the alumina brick and slow down the destructive conversion or phase change of alpha alumina to beta alumina.

It is of course necessary that the salt or salt mixture impregnated into the refractory or alumina brick be compatible or non-reactive with the salts of the molten salt medium 10. Thus, for example, the salt pre-impregnated into the pores of the refractory brick can be sodium carbonate, and the molten salt reaction medium can be sodium carbonate. It is thus seen that the salt impregnated into the refractory brick can be the same or different from the salt composition of the molten salt reaction medium.

Figure 2:
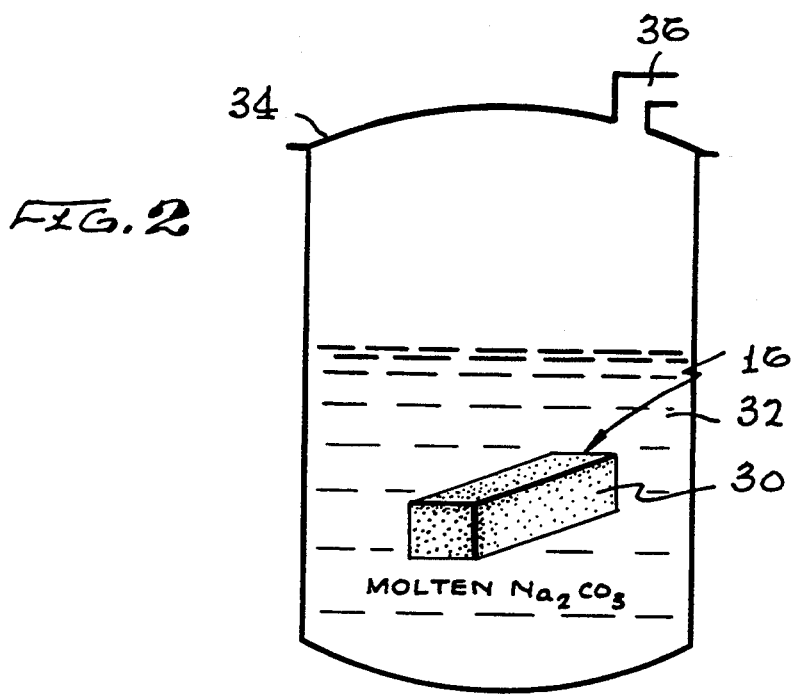
FIG. 2 is a diagram of apparatus which illustrates a method for impregnating porous refractory bricks such as porous alumina, with a non-reactive salt according to the invention.

FIG. 2 of the drawing illustrates the manner of impregnation of the non-reactive salt into the refractory bricks or blocks 16 of the reaction vessel. A porous refractory brick or block 30 is placed in a bath of molten salt indicated at 32, such as sodium carbonate, to be impregnated into the pores of the brick or block 30. An alpha high alumina brick contains about 8 to 22% open porosity while a fused cast alpha alumina brick contains about 1 to about 6% open porosity. The vessel 34 containing the molten salt 32 and alumina brick 30 is maintained in an electric furnace (not shown) to heat the sodium carbonate above the fusion temperature of about 850° C.

The desired impregnate, that is sodium carbonate, is forced into the open porosity of the brick 32 by diffusion, which is slow, or preferably by high vacuum or pressure. The molten liquid salt, sodium carbonate, has a viscosity about that of water. After the brick is placed in the molten bath 32 pressure can be applied at pressure port 36 to the bath either pnumatically or mechanically. Alternatively, the vessel 34 can be evacuated at 36 to impregnate the brick. Either pressurization or drawing a vacuum will cause the pores or spaces in the brick to be filled with the sodium carbonate salt, thus impregnating the brick with the non-reactive sodium carbonate, and forming the pre-impregnated refractory bricks 16.

The following is an example of practice of the invention:

Porous alpha alumina refractory bricks having an open porosity of about 15% are immersed in a bath of molten sodium carbonate at 850° C. contained in a heated pressure vessel within an electric furnace, and a pressure of about 45 psi is applied to the interior of the vessel. After a period of about 5 minutes the pressure is released, and the bricks pre-impregnated with sodium carbonate are employed as refractory in a molten salt reaction vessel of the type illustrated in FIG. 1.

The reaction vessel is used in a molten salt process for destruction of fluorine-containing organic waste containing the Freon dichloro-difluoro methane, in molten sodium carbonate at 900° C., and producing sodium fluoride and sodium chloride reaction products. The process is carried out for an extended period of about 4 to 6 months without any observable detereoriation or destruction of the pre-impregnated alumina refractory bricks.

From the foregoing, it is seen that the invention provides a reactor or reaction vessel for molten salt oxidation of fluorine-containing organic wastes which incorporates a refractory which is modified to resist diffusion of destructive fluorine-containing compounds into the pores of the refractory, particularly alumina, and avoiding destructive physical changes in the refractory.

It is to be understood that what has been described is merely illustrative of the principles of the invention and that numerous arrangements in accordance with this invention may be devised by one skilled in the art without departing from the spirit and scope thereof.

What is claimed is:

1. In a molten salt oxidation system for oxidizing fluorine-containing organic waste comprising a vessel containing a molten salt including fluorine compounds, said vessel having a containment wall formed of diffusion resistant refractory for containment of fluorine and fluorine compounds in said molten salt, the improvement which comprises
a containment wall comprising a porous refractory impregnated with a salt which is non-reactive with said refractory, thereby effectively blocking diffusion paths for fluorine and its compounds from said molten salt through said refractory, wherein said non-reactive salt comprises a halide or a carbonate.

2. The diffusion resistant refractory of claim 1, wherein said refractory comprises alpha alumina.

3. The diffusion resistant refractory of claim 2, wherein said alumina has an open porosity ranging about 1 to about 25%.

4. The diffusion resistant refractory of claim 1, wherein said non-reactive salt is selected from the group consisting of alkali carbonate, alkali carbonate-alkali chloride mixtures, and alkaline earth oxide-alkaline earth halide mixtures.

5. The diffusion resistant refractory of claim 1, wherein said non-reactive salt is selected from the group consisting of sodium carbonate, sodium carbonate-sodium chloride mixtures and calcium oxide-calcium chloride mixtures.

6. The diffusion resistant refractory of claim 1, wherein said molten salt comprises alkali carbonate, mixtures thereof with alkali halide, and mixtures of calcium oxide and calcium chloride.

7. The diffusion resistant refractory of claim 1, wherein said molten salt includes fluorine-containing organic waste.

8. In a molten salt oxidation system for destruction of fluorine-containing organic waste comprising a vessel containing a molten salt including fluorine compounds, diffusion resistant refractory forming the wall of said vessel for containment of fluorine and fluorine compounds in the molten salt, the improvement which comprises a porous alumina refractory having an open porosity ranging from about 1 to about 25% impregnated with a salt which is non-reactive with said alumina refractory and compatible with said molten salt, and which can form sacrificial stable and harmless fluoride compounds when reacted with fluorine and fluorine compounds, wherein said non-reactive salt comprises a halide or a carbonate.

9. The diffusion resistant refractory of claim 8, said non-reactive salt selected from the group consisting of sodium carbonate, sodium carbonate-sodium chloride mixtures and calcium oxide-calcium chloride mixtures.

10. A molten salt treatment system for organic fluorine-containing waste which comprises
a molten salt oxidation reaction vessel containing a molten salt,
said molten salt containing fluoride compounds produced by reaction of fluorine-containing organic waste with said molten salt,
said vessel having a wall formed of a porous refractory impregnated with a salt which is non-reactive with said refractory and blocks diffusion of said fluoride compounds into said refractory, wherein said non-reactive salt comprises a halide or a carbonate.

11. The molten salt treatment system of claim 10, wherein said molten salt further comprises an alkali carbonate and said non-reactive salt is selected from the group consisting of alkali carbonate, alkali carbonate-alkali chloride mixtures, and alkaline earth oxide-alkaline earth halide mixtures.

12. The molten salt treatment system of claim 10, wherein said refractory comprises alpha bricks having a porosity from about 1% to about 25%.

13. The molten salt treatment system of claim 12, wherein said non-reactive salt is selected from the group consisting of sodium carbonate, sodium carbonate-sodium chloride mixtures and calcium oxide-calcium chloride mixtures.

14. The molten salt treatment system of claim 13, wherein said non-reactive salt is calcium oxide, calcium chloride mixtures capable of forming sacrificial stable and harmless fluoride compounds when reacted with fluorine or fluorine compounds.

* * * * *